Dec. 22, 1959  E. A. NUSSBAUMER  2,917,948
DIFFERENTIAL DRIVE
Filed June 6, 1957  6 Sheets-Sheet 1

INVENTOR.
ERNST A. NUSSBAUMER
BY
ATTORNEYS

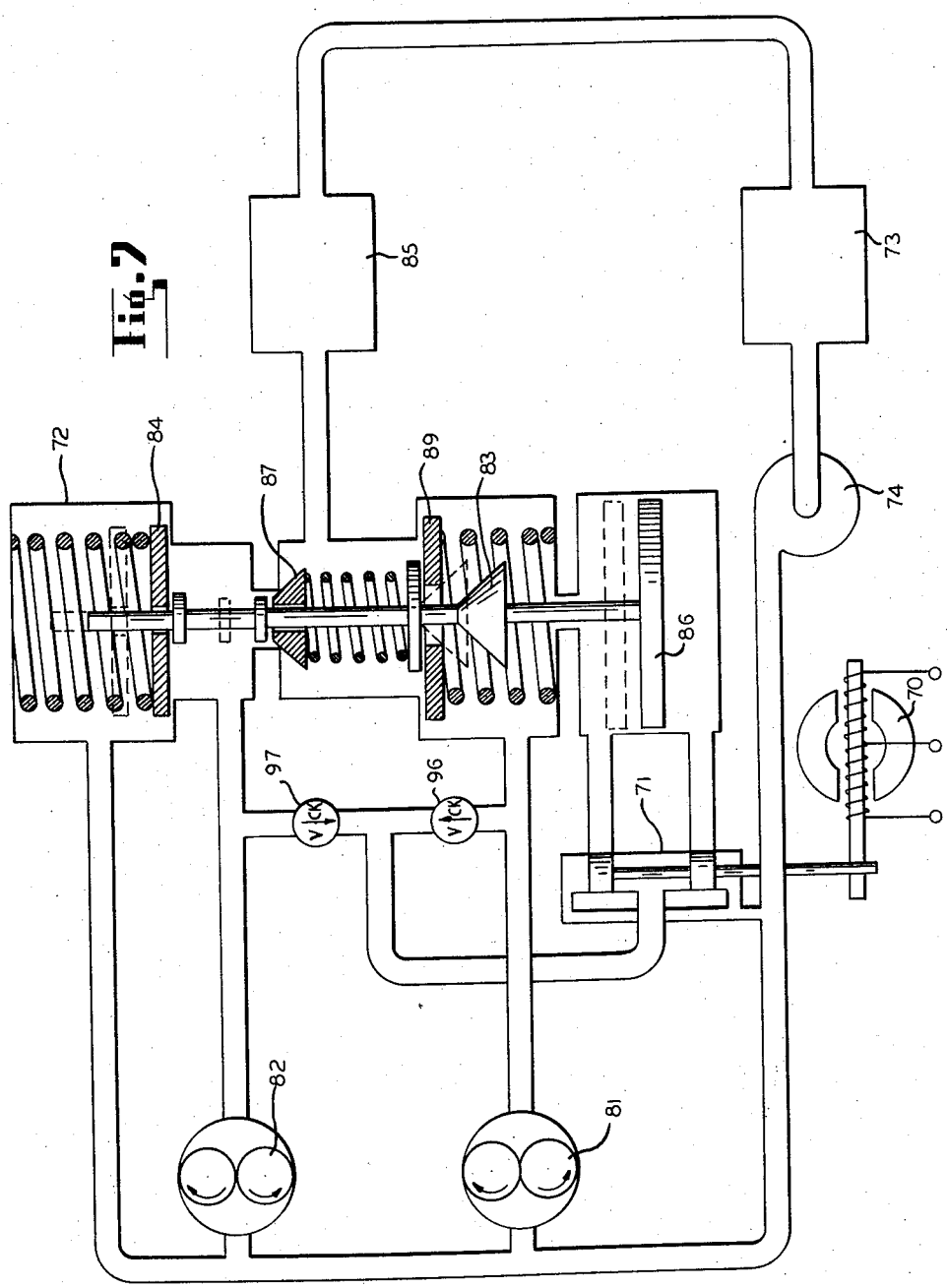

United States Patent Office
2,917,948
Patented Dec. 22, 1959

2,917,948

DIFFERENTIAL DRIVE

Ernst A. Nussbaumer, Washington, D.C., assignor to Grovar, Incorporated, Washington, D.C., a corporation of Delaware Application June 6, 1957, Serial No. 663,946

3 Claims. (Cl. 74—687)

This invention relates generally to a differential drive and more particularly to an improved type of a planetary constant speed drive for driving an alternator from a jet engine without imposing the varying engine speed on the alternator.

The present invention relates to specific improvements in the structure and functional characteristics of a constant speed drive designed for mounting on an engine accessory pad to drive an alternator at constant speed under conditions of varying engine speed from idle to military rating. It further has the basic advantages of smaller size, less weight, and improved efficiency over presently available constant speed drives.

The unit of the invention has a plurality of speed stages, two of which are specifically illustrated, the first stage is essentially the upper half of the unit and the second stage is the lower half. Both stages are connected to common input and output shafts through suitable gears. The two stages are similar in construction except for the gear ratios which determine the operating speeds for peak efficiency. Each stage comprises a gear train, where the drive is an epicyclic gear train and can be driven in reverse by applying power at the output shaft. Each gear train includes input and output planetary gears mounted on a common shaft which in turn is retained in a spider. In the illustration, three sets of these planetary gears 120° apart are mounted on a common spider as shown. The second planetary gear of each set drives a sun gear which through the intermediation of another gear in turn drives a gear on the output shaft. The spider of each stage drives a hydraulic loading pump having inlets and outlets for conducting hydraulic fluid for association with suitable control valves. Each spider is held stationary except for slippage when the loading pump driven by the spider is dead ended by closing the discharge valve of the pump. The spider is allowed to rotate by opening the discharge valve of the loading pump. If the valves are fully open, the gears will rotate freely, because the oil can circulate to and from the oil sump through suitable passageways without resistance; consequently, the driven member will remain stationary. If, however, the valves are closed gradually, there will be a correspondingly increase in resistance to the rotation of the gearing, and as a result, the driven member will rotate at a rate of speed depending upon the amount of resistance. Therefore, the planetary gear drive is multi-staged for increasing efficiency of the drive, one stage to be used for idling speeds, and another stage can be used for cruising speeds; a third stage or any number of additional stages can also be used if so desired.

It is an object therefore of this invention to provide a planetary constant speed drive between the driving and driven members under the control of the flow of fluid in the unit which can be regulated to develop a constant speed output regardless of variations in input speed.

It is also an object of this invention to provide a drive comprising an epicyclic gear train which can be driven in reverse by applying power at the output shaft, this feature can be in conjunction with a starter-generator attached to the output shaft of the drive.

It is a further object of this invention to provide a plural stage drive unit which selectively advances to the successive stages to operate as direct drives through these stages to provide efficiencies over a wide speed range.

A still further object of this invention is to lubricate the bearings and gears of the unit by utilizing pressure passages from the discharge of the loading pumps to the various lubricating points and dumping this oil into the main housing from which the oil is drained so that the rotating spiders will not churn the oil during the rotation thereof.

A still further object of this invention is to provide a three-gear pump with multiple inlet and outlet ports, giving better balance on bearings carrying the gear shafts.

Another object of the invention is to provide a drive having a coaxial shaft for the output drive and spindle drive to the gear pump all confined in the unit housing.

Still another object is to provide a rugged mechanical drive unit of smaller size and weight than presently found with available units.

An additional object is to provide a planetary constant speed drive where the direction of rotation of the input drive may be in either direction.

An additional object is to provide a multi-stage drive where the peak efficiency for each stage occurs at speeds under which the engine is driven most of the time such as idle, cruising, and top speeds.

Many other features, advantages and additional objects of the present invention will become manifest to those versed in the art upon making reference to the detailed description which follows and the accompanying sheets of drawings in which a preferred structural embodiment of a planetary constant speed drive incorporating the principles of the present invention is shown by way of illustrative example.

On the drawings:

Figure 7 is a schematic layout of the control system to maintain the drive unit at a constant speed.

As shown on the drawings:

Figure 1:
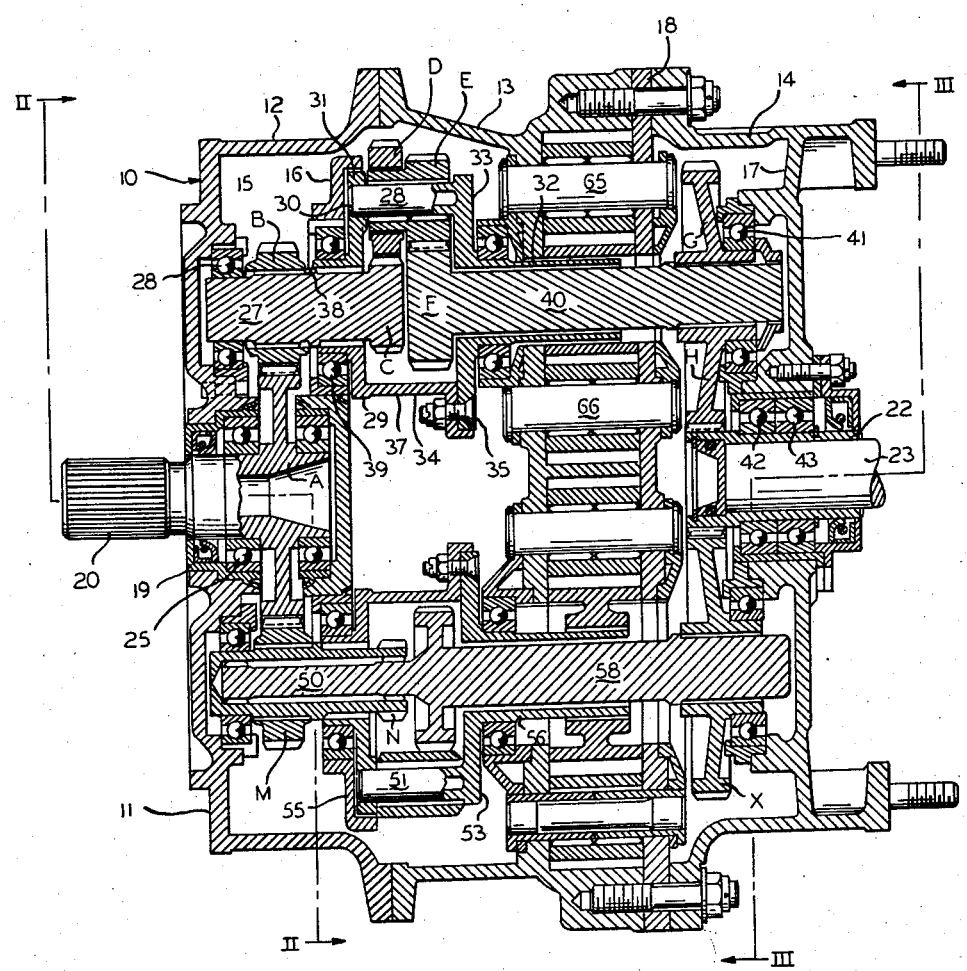
Figure 1 is a cross-sectional view of a planetary constant speed drive unit of this invention.
Figure 2:
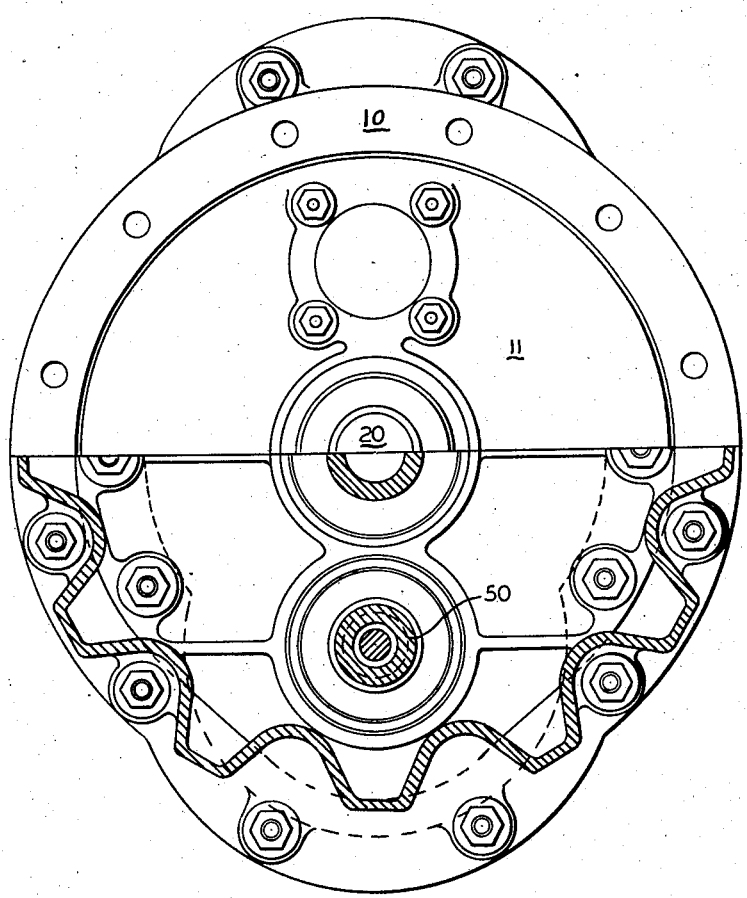
Figure 2 is an end elevational view of the drive unit, parts in section, and taken substantially on the plane of line II—II of Figure 1.
Figure 3:
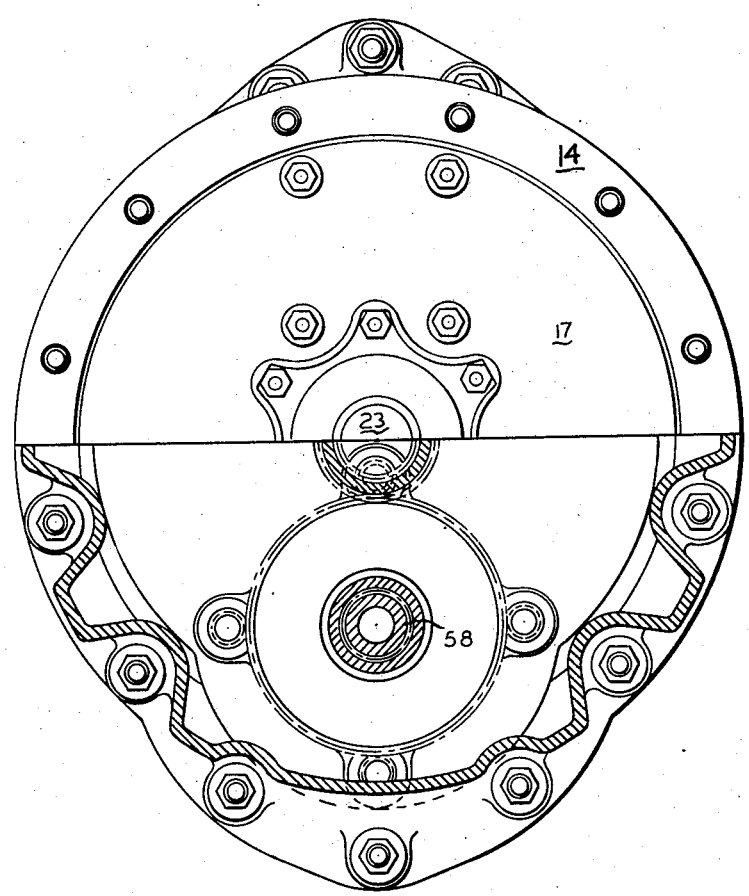
Figure 3 is an end elevational view of the drive unit, parts in section, and taken substantially on the plane of line III—III of Figure 1.

The principles of the present invention are of general application to constant speed drives, however, in the illustrative embodiment herein described by way of one exemplary structure incorporating the principles of the present invention, a planetary constant speed drive is shown indicated at 10 which comprises a housing 11 formed by a plurality of sections, fastened together as indicated on Figure 1 by numbers 12, 13 and 14.

The housing part 12 is suitably constructed to support a plurality of shafts by suitable bearings, and provided with a central aperture 19 through which an oil seal and input shaft 20 extend. Part 14 is constructed in a similar manner to that of part 12 and provided with a central aperture 22 through which an oil seal and the output shaft 23 extend. Part 13 substantially a cylindrical housing bolted between parts 12 and 14. Said parts 12, 13 and 14 form a liquid-tight housing whereby lubrication of the bearings and gears is accomplished internally by utilizing oil in pressure passages from suitable discharge pumps to the various lubricating points and allowing the oil to flow into the sump of the main housing 11. A drain is provided in housing 11 so that excess oil can be removed so that the spiders supported upon the gear shaft will not churn the oil in said sump as they rotate. Since the housing parts 12 and 14 have inner and outer transverse walls, the housing 11 has substantially three chambers. Part 12 has an outer wall 15 and an inner wall 16. Part 14 has an outer wall 17 and an inner wall 18.

The input shaft 20 may be connected to a jet engine or to any other convenient source of power and the drive shaft, or output shaft 23, may be constructed to effect the rotation of an alternator. A central portion of shaft 20 is rotatably mounted in a bearing 25 supported in wall 15 of part 12 and the inner end thereof in a bearing 26 supported in wall 16 of part 12. Said shaft 20 has secured integrally therewith a gear A which drives a pinion gear B secured adjacent one end of a pinion gear shaft 27, the free end of shaft 27 mounted in bearing 28 supported in wall 15. A sun gear C is rigidly secured upon the opposite end of pinion shaft 27. Sun gear C drives the first planetary gear E fixed on the hub of gear E, which is bushed and free to revolve on the shaft 28 forming a part of spider 29. The forward end 30 of said shaft 28 is fixed in spider housing wall 31. It should be noted that the spider 29 comprises a rearwardly extending spindle or hollow shaft 32, a disc-shaped body portion 33, three shafts 28, 28a and 28b, equally spaced and mounted 120° apart, and a spider housing 34 bolted to said disc-shaped body portion 33 by bolts 35. Said spider housing 34 is provided with an annular horizontal flange portion 37 which extends forwardly thereof and into contact with a hub portion 38 of shaft 27, said flange portion 37 supporting and rotatably mounted in the inner race of ball bearing 39 which has its outer race mounted in the inner wall 16 of part 12. Since the spider 29 comprises three shafts, it must be noted that there is a planetary gear D and a planetary gear E on each of said shafts, clearly shown by Figure 5. The second planetary gear E on each shaft drives the second sun gear F which is mounted on one end of shaft 40 which has secured on the opposite end thereof gear G mounted in bearing 41 secured in wall 17. Said gear G in turn drives a gear H mounted on an output shaft 23 suitably mounted in bearings 42 and 43 sealed and secured in the central aperture 22 of end wall 17.

Figure 4:
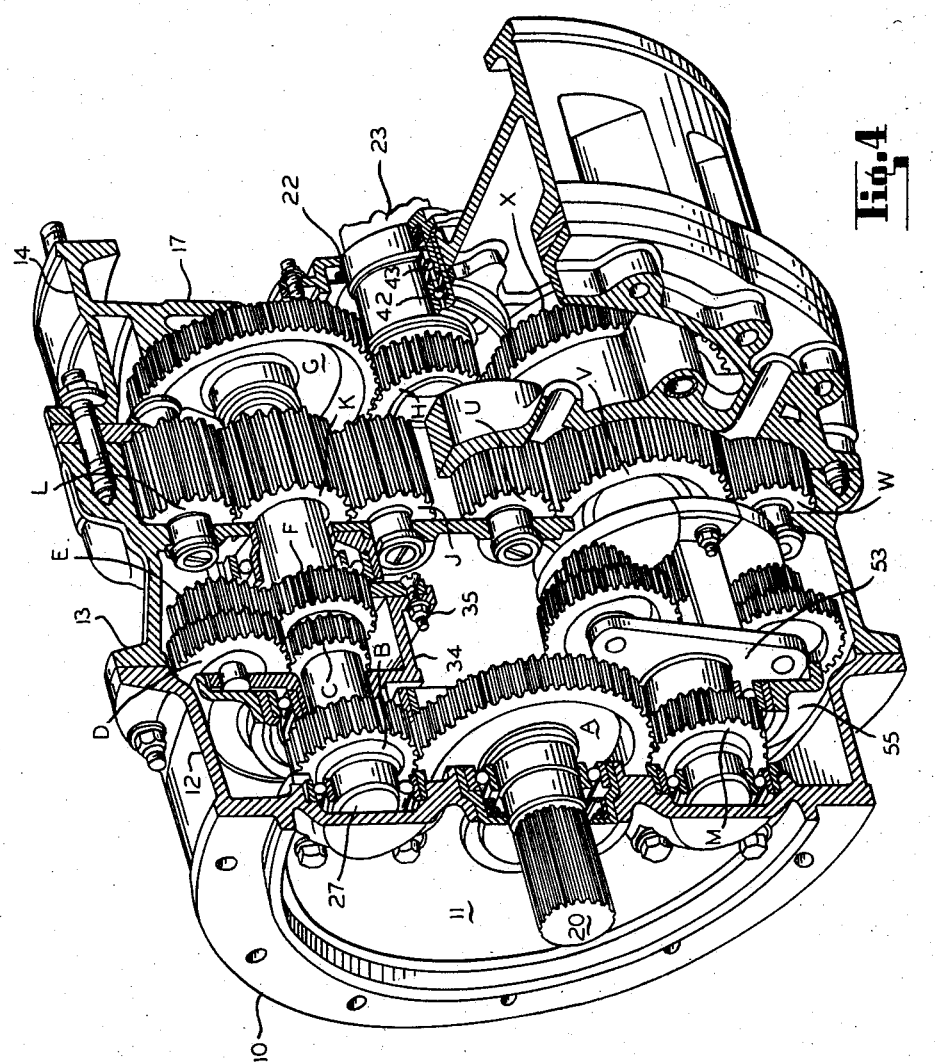
Figure 4 is a perspective view of the drive unit in accordance with the principles of the present invention, a portion of the housing and some portions of the drive omitted for sake of clearness.
Figure 5:
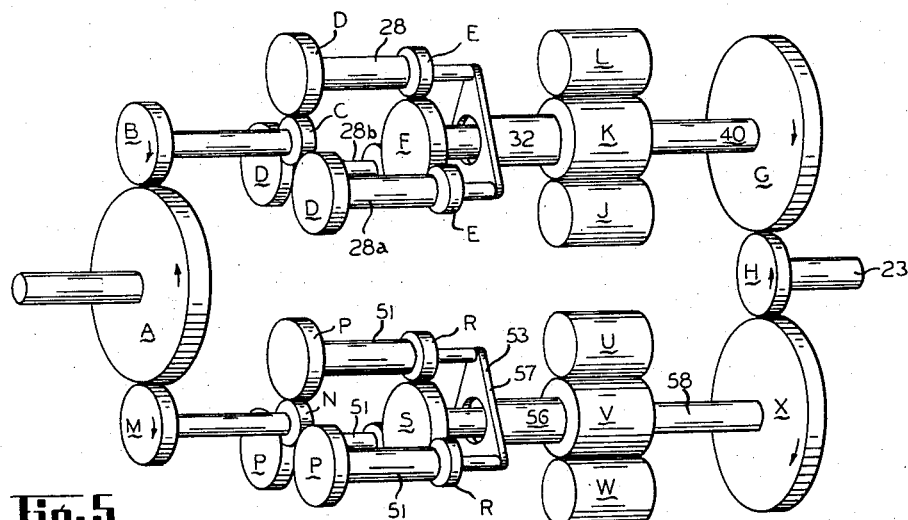
Figure 5 is a schematic layout of the drive unit in accordance with the principles of the present invention.

The second stage of the speed drive is constructed substantially as the first stage, said gear A which drives a pinion gear B in the first stage also drives a pinion gear M of the second stage. Figures 1, 4 and 5 clearly show the construction of the second stage where gear A drives gear M secured adjacent one end of a pinion gear shaft 50. A sun gear N is rigidly secured upon the opposite end of pinion shaft 50. Said sun gear N driving the three planetary gears P fixed on the hubs of gears R, said gears R being bushed and free to rotate on the shafts 51 of spider 53, the forward ends of said shafts 51 fixed in the spider housing wall 55. Said spider 53 comprises a rearwardly extending spindle or hollow shaft 56, a disc portion 57 and three shafts 51. The second gear R of the planetary gears on each shaft drives the second sun gear S which is mounted upon one end of shaft 58 which has secured on the opposite end thereof gear X mounted in bearing secured in end wall 17. Said gear X in turn drives said gear mounted on output shaft 23 described above. The gears of the second stage are similar and are assembled as in the first stage; however, they have different gear ratios as desired.

The spindle 32 of spider 29 in the first state of the speed drive rotates on a center line concentric with the center line of shaft supporting F—G, which is on the same center line of the shafts supporting gears B—C. Said spindle 32 is connected with gear K of the first stage loading pump. Said gear K in turn drives gears J and L of the loading pump. The spindle 56 in the second stage of the speed drive rotates on a center line concentric with the center line of the shaft supporting gears S—X, which is on the same center line of the shafts supporting gears M—N. Said spindle 56 is connected with gear V of the second stage loading pump. Said gear V in turn drives gears U and W of the second stage loading pump. Figure 4 clearly shows the inlet passageway 60 and discharge passageway 61 for the hydraulic fluid of the second stage loading pump.

There are also corresponding inlet and discharge ports on the opposite side of the second stage pump not shown in the illustration. The first stage load pump also has two inlets and discharge ports each.

As stated before, the spider is held stationary except for slippage when the loading pump driven by the spider is dead ended by closing the discharge valve of the pump. Therefore, spider 29 will be held stationary when the loading pump of the first stage is dead ended, and the spider 56 will be held stationary when the loading pump of the second stage is dead ended. Each of the spiders 29 and 56 are allowed to rotate by opening the discharge valve of the loading pump associated therewith. In each stage when the spider is stationary the ratio of input to output speeds may be calculated from the gear ratios of the train of gears A through H of each stage. This point of operation when the spider is stationary occurs with the lowest input speed for the corresponding stage and maximum efficiency because the work put in the loading pump is a minimum. As the input speed increases, the output speed is maintained at the predetermined constant value by allowing the spider to rotate. The spider in either stage is allowed to rotate by opening the discharge valve of the loading pump in the corresponding stage. Therefore, the output speed can be controlled at a constant value by regulating the discharge valve to control spider speed.

Figure 6:
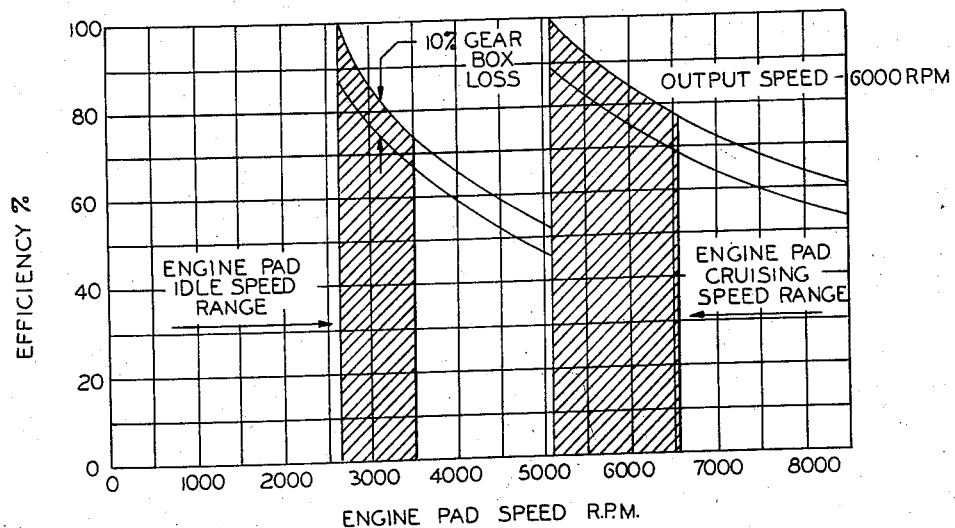
Figure 6 is a graph illustrating efficiencies for both stages of the drive unit and the manner in which the unit is operated to use only the top efficiencies of each stage.

The performance of the proposed planetary drive may be described with reference to Figure 6. It shows a theoretical efficiency curve for each of the two stages of the drive unit. The 100% peak efficiency points occur when the loading pump speed of each unit is zero and the stage is operating under non-slipping or non-yielding conditions. As the engine pad speed increases from the 100% efficiency point, then the loading pump must be allowed to rotate to maintain the constant 6,000 r.p.m. output speed. Therefore, the efficiency curve shown in Figure 6 is theoretically a single curve for each pump independent of the output load. A 10% loss of input power in efficiency estimated for the gearing in both stages is also shown by Figure 6.

The transition from the first stage to the second stage actually will not occur at a fixed engine pad speed. The transition will be gradual over a relatively small band of input speed change. During the transition, there will be a partial load on each of the two stages and this will be controlled by the discharge throttling valve of the loading pumps of a desired structure, as shown for example by Figure 7. Also, sudden acceleration or deceleration of the components in each of the stages will not occur since all of the gears and loading pumps are always engaged and running at corresponding relative speeds determined only by the ratio of output to input speeds.

As illustrated when the engine is operated at idle speed the first stage operates at efficiencies dropping from 100% to 70% when the second stage is then cut in to operate in "direct drive" at 100% efficiency. As speed increases then the second stage pump must work and the efficiency drops off to 70%. However, if all of the drive was accomplished through one stage the efficiency would rapidly drop off to 50% or less upon increase in speed beyond the idle range.

Two hydraulic loading pumps embodied in the drive unit are of the three-element gear type. Gear K is mounted upon and keyed to spindle 32, which in turn drives gears J and L mounted upon short shafts 65 and 66. One pump is operated for each speed stage, and the two are operated alone or in combination as desired to regulate the speed of rotation of the spiders in the gear chamber. In the first stage as illustrated in the drawings, Figure 5, gear K effects the rotation of idler gears J and L. These idler gears are housed in the upper section of the pump chamber and act as a pump, and circulate oil through the chamber from the inlet and to the outlet passageways, provided the valve means is open. If the valve means, shown by Figure 7 is fully open, the gears will rotate freely, because the oil can circulate through the passageways without resistance; consequently, the driven member will remain stationary. If and when the valve means is gradually closed, there will be a corresponding increase in resistance to the rotation of the spiders and gears in the gear chamber, and as a result, the driven member will rotate at a speed depending upon the amount of resistance. If the valve means is completely closed, rotation of the spider is prevented. The pump in the second speed stage is constructed with the same number of gears as in the first stage, the turning of the gear V will effect rotation of idler gears U and W.

A suitable valve control system, employable with the plural stage drive unit of this invention to selectively advance the stages with efficiencies over a wide speed range, is illustrated in Figure 7. In the illustrated system, a torque motor 70 controls a pilot valve 71, said pilot valve regulating the pressures on both sides of the piston of the loading pump discharge valve 72. Accordingly, the piston positions the discharge valve to maintain the speed of the loading pumps such that they will keep the alternator, driven by shaft 23, at a predetermined constant speed. The booster pump 74 is connected with the oil sump 73 to supply oil to the low and high speed pumps, 81 and 82 respectively. A heat exchanger 85 is shown in direct connection with the oil sump. The control system also embodies high speed bypass valve 84, a high speed poppet valve 87, a low speed bypass valve 89, a low speed poppet valve 83, a piston 86, a high speed gear pump 82, a low speed gear pump 81, suitable check valves 96 and 97 as well as other suitable operative parts and combination of parts. Said control system is extremely efficient and provides the necessary means for operating said plural stage drive. Since this control system is only an example of a suitable valve control for the pumps of the drive unit of this invention and is not specifically a part of this invention, it is being specifically described and claimed in assignee's copending application, Serial No. 664,132, filed June 6, 1957.

Although various minor structural modifications might be suggested by those versed in the art, it would be understood that I wish to embody within the scope of the patent warranted hereon all such modifications as reasonably and properly come within the scope of my contributions to the art.

I claim as my invention:

1. A two speed stage differential drive unit comprising a housing having end walls and side walls, a partition extending through the housing forming a pair of adjoining chambers therein, a drive shaft extending through an end wall of the housing into a first of said chambers, a drive gear on said drive shaft in said first chamber, a driven shaft extending through the opposite end wall of said housing and into the second of said chambers, a driven gear on said driven shaft in said second chamber, first and second hydraulic loading pumps assembled within said second chamber, each of said pumps including a center gear and a pair of outer gears meshing with said center gear and provided with a gear pump enclosure having inlet and outlet passages, a differential drive between the drive and driven shafts and located in said first chamber, a first stage of the differential drive embodying a first sun gear connected to be driven by said drive gear, a second sun gear connected to drive said driven gear, planetary gears mounted upon a spider means and in mesh with said first and second sun gears, means connecting said spider means to said center gear of the first hydraulic pump through said partition, a second stage of the differential drive embodying a first sun gear connected to be driven by said drive gear, a second sun gear connected to drive said driven gear, and planetary gears mounted upon a spider means and in mesh with said first and second sun gears, means connecting said spider to the center gear of said second hydraulic pump through said partition, first and second valve means regulating fluid flow through said first and second pumps respectively to vary resistance on the planetary gears of the first and second differential stages for varying the transmission ratios of each stage, each of said differential stages being incapable of delivering power until some resistance is placed upon fluid flow from the pump driven thereby, each of said stages having a different gear ratio, and means for controlling said first and second valve means and sequentially closing the valve means with the first valve means being closed gradually from free flow to no flow and the second valve means then closed from free flow to no flow whereby the flow in the first pump is stopped before the flow is restricted in the second pump and whereby each differential stage will successively operate from a maximum ratio change to a minimum ratio change before the next stage becomes effective as a drive.

2. A mechanical power transmission for obtaining a constant speed output from a variable speed input comprising a power input shaft, a power output shaft, means forming a first drive train between said input shaft and said output shaft including a planetary gearing consisting of a planetary gear with a carrier member and a pair of sun gear members, one of said members being connected to the input shaft, another of said members being connected to the output shaft, the resistance to rotation of the remaining member determining the power transmission gear ratio of the gearing, a first fluid pump connected to said remaining member and providing a resistance to rotation of said third member, means forming a second drive train between said input shaft and said output shaft parallel to said first train including a planetary gearing with members consisting of a planetary gear with a carrier member and a pair of sun gear members with the one of said members being connected to the input shaft, another of said members being connected to the output shaft, the resistance to rotation of the remaining member determining the power transmission speed ratio of the gearing, said planetary gearing of said second train having a higher gear ratio from the input to the output shaft than the planetary gearing of said first train, a second fluid pump connected to the remaining member and providing a resistance to rotation of said remaining member, first and second valve means connected to said first and second pumps respectively for controlling the flow of fluid from said individual pumps and controlling the restistance to rotation of the pumps, and an operating means connected to said valve means for maintaining the speed of the output shaft constant with decrease in speed of the input shaft by first gradually decreasing the opening of the valve for the second pump and when the valve is closed gradually decreasing the opening of the valve for the first pump.

3. A mechanical power transmission for obtaining a constant speed output from a variable speed input comprising a power input shaft, a power output shaft, means forming a first drive train between said input shaft and said output shaft including a planetary gearing consisting of a pair of sun gear members and a planetary gear with a carrier member, one of said members being connected to the input shaft, another of said members being connected to the output shaft, a first gear pump connected to the remaining member, means forming a second drive train between said input shaft and said output shaft parallel to the first train and including a planetary gearing consisting of a pair of sun gear members and a planetary gear with a carrier member, one of said members being connected to the input shaft, another of said members being connected to the output shaft, said planetary gearing of the second train having a higher gear ratio from the input to the output shaft than the planetary gearing of said first train, a second gear pump connected to the remaining member of said second drive train, separate flow control valve means connected to said first and second gear pumps for throttling the flow through said individual gear pumps and operative to control the freedom of rotation of the gears and for maintaining the speed of the output shaft constant with increase in speed of the input shaft, and means connected to said flow control valve means for sequentially operating said valve means and connected to operate said valve means by first increasing the freedom of rotation from a locked position of the first pump when a predetermined speed of the input shaft is reached and connected to operate said valve means by next increasing slippage in the second pump in the second train as the input shaft speed increases so that power losses are decreased.

References Cited in the file of this patent

UNITED STATES PATENTS

| | | |
|---|---|---|
| 1,873,200 | Hedstrom | Aug. 23, 1932 |
| 2,181,118 | Burner | Nov. 28, 1939 |
| 2,263,707 | Strigl | Nov. 25, 1941 |
| 2,286,485 | Hild | June 16, 1942 |
| 2,480,032 | Kochis | Aug. 23, 1949 |
| 2,653,487 | Martin et al. | Sept. 29, 1953 |

FOREIGN PATENTS

| | | |
|---|---|---|
| 535,075 | Great Britain | Mar. 27, 1941 |